H. JOHNSON.
APPARATUS FOR THE PRODUCTION OF STEEL.
APPLICATION FILED NOV. 15, 1910.

1,032,217.

Patented July 9, 1912.
2 SHEETS—SHEET 1.

Witnesses

Inventor
Henry Johnson

H. JOHNSON.
APPARATUS FOR THE PRODUCTION OF STEEL.
APPLICATION FILED NOV. 15, 1910.

1,032,217.

Patented July 9, 1912.

2 SHEETS—SHEET 2.

Witnesses:

Inventor
Henry Johnson

UNITED STATES PATENT OFFICE.

HENRY JOHNSON, OF SHEFFIELD, ENGLAND, ASSIGNOR TO VERDON CUTTS & HOULT, OF SHEFFIELD, ENGLAND.

APPARATUS FOR THE PRODUCTION OF STEEL.

1,032,217.      Specification of Letters Patent.      Patented July 9, 1912.

Application filed November 15, 1910. Serial No. 592,572.

*To all whom it may concern:*

Be it known that I, HENRY JOHNSON, steel founder, subject of the King of Great Britain, residing at 151 Machen Bank, Netheredge, Sheffield, in the county of York, England, have invented certain new and useful Improvements in and Apparatus for the Production of Steel, of which the following is a specification.

This invention relates to the production of steel, and has for its object improvements in apparatus therefor, whereby the cost of the installation and the cost of the production of the steel is reduced while increasing the output.

According to this invention, the converter is a closed vessel of a cylindrical or barrel shape mounted to rotate end over end about an axis which is at right angles to that of the vessel, a charging opening being provided in the side and about midway between the ends in or about a line with the hollow or other trunnions upon which the converter may be rotated, the size of the opening being determined by the capacity of the converter. At one end of the converter and passing through the side (and) or through the end itself, horizontal, (and) or vertical, twyers may be fitted. At the opposite side of and just below the charging opening, suitable electrodes may be fitted in such a way that by tilting the converter the metal will be brought near to or into contact with said electrodes, or the electrodes may be arranged to be tilted or adjusted near to the metal.

An apparatus according to this invention is illustrated in the accompanying drawings, in which—

Figure 1:
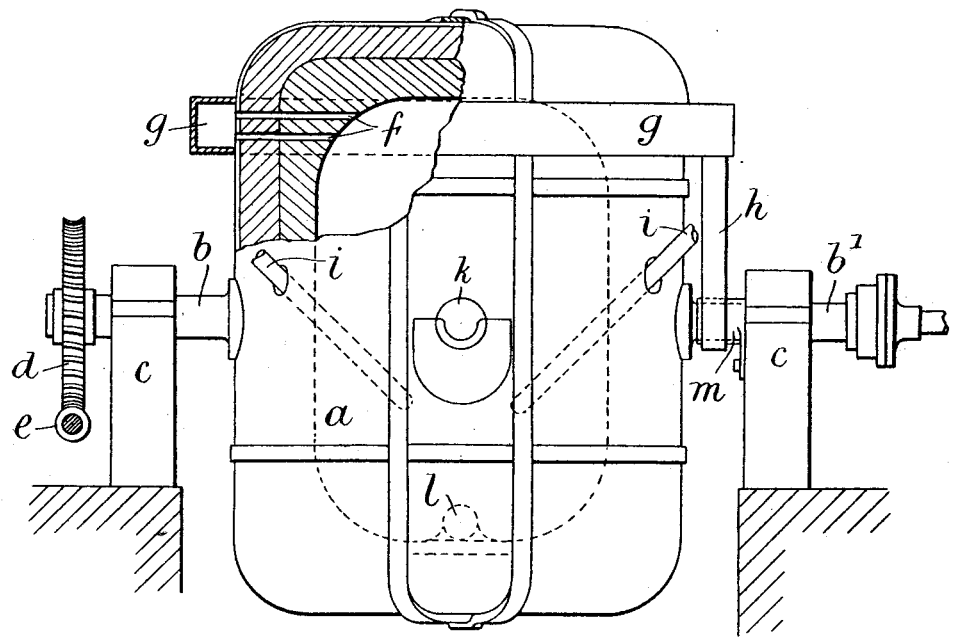
Figure 2:
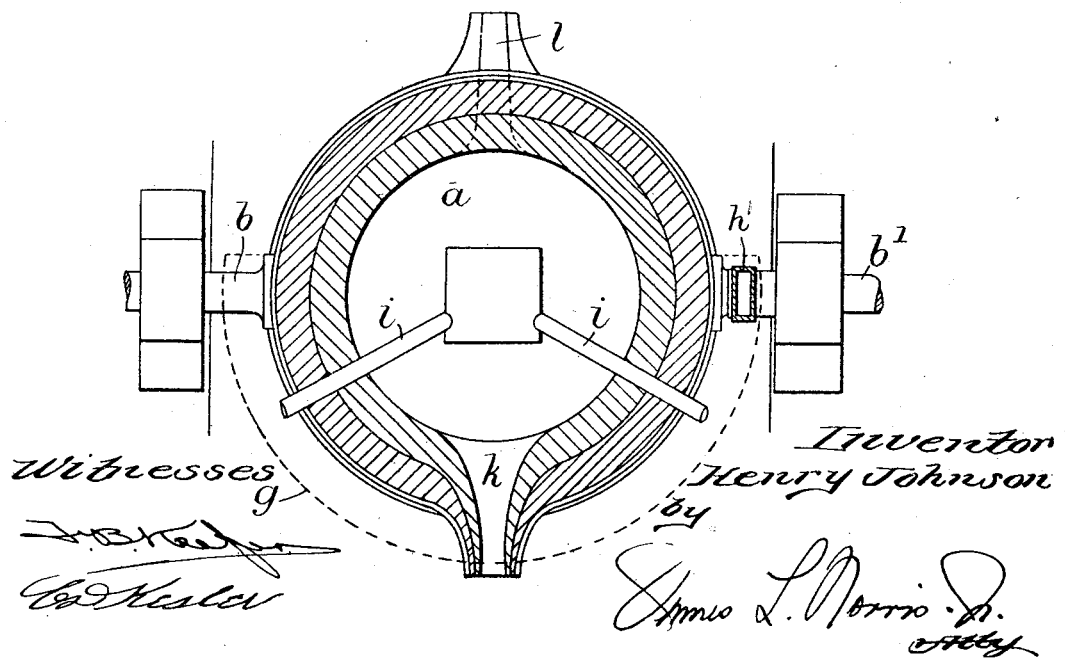
Figure 3:
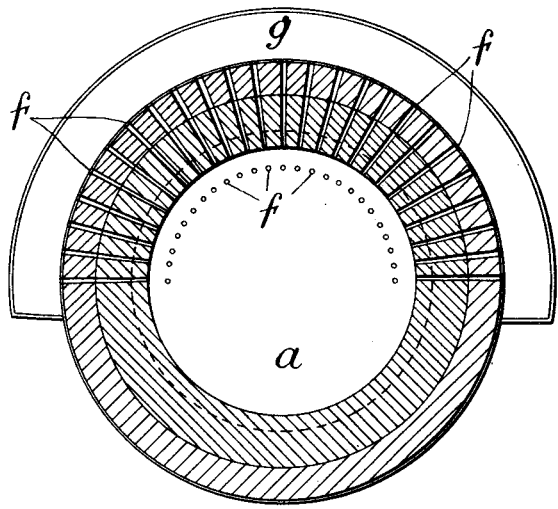
Figure 4:
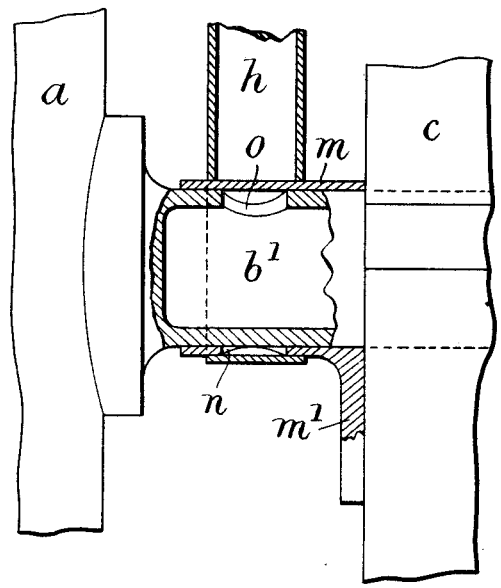

Figure 1 is an elevation (partly in section), Fig. 2 is a horizontal section of Fig. 1, and Fig. 3 is a horizontal section of the twyer end. Fig. 4 is an enlarged section of a detail.

$a$ is the converter which is carried by trunnions $b$ $b'$ mounted in bearings $c$ and adapted to be rotated or inverted by suitable means such as the worm wheel $d$ fixed to the trunnion $b$ and worm $e$ driven from any suitable source of power. The converter $a$, which is double-ended, is fitted at one end with twyers $f$ and twyer box $g$ communicating by means of an air trunk $h$ with the hollow trunnion $b'$ to which air under pressure is supplied from a suitable source. The other end of the converter is arranged for refining or finishing the metal, electrodes $i$ being provided, or these may be replaced by twyers adapted for surface blowing. The mechanism for adjusting and cooling the electrodes is well known and is omitted from the drawing. The converter $a$ is formed with a charging opening $k$, and may be provided with a tapping hole $l$ at one or at both ends, that shown being at the refining end of the converter. The finished metal may be drawn off from the tapping hole or holes or from the charging opening, and the latter may be fitted or provided with a removable cover plate or door containing sight holes provided with mica or colored glass, through which the operations may be inspected or observed. Samples of the metal may be taken from time to time and slag removed, through the said charging opening.

Means of a known type are preferably provided whereby when the converter is inverted, as shown in Fig. 1, the air supply is automatically shut off from the twyer box $g$. An improved device of this character is shown in Fig. 4, and consists of a stationary sleeve $m$ fixed to the bearing $c$ by a flange $m'$ and formed with an opening $n$. The sleeve $m$ surrounds and fits the exterior of the hollow trunnion $b'$ which is formed with an opening $o$, so that the trunnion $b'$ converter $a$, and air trunk $h$ may rotate without undue loss of air. When the converter is in its normal position with the twyers $f$ at the lower end the opening $o$ in the trunnion $b'$ registers with the opening $n$ in the sleeve $m$, so that air is free to pass to the air trunk $h$ and thereby to the twyer box $g$ and twyers $f$.

Using the above described converter, the process may be carried out in the following manner:—The converter is pre-heated in the ordinary way, and tilted or rotated into a horizontal position with opening $k$ uppermost, the tapping hole or holes being closed. The molten metal is drawn from a cupola or mixer, and poured through the opening $k$ into the converter. (If the metal is drawn from a cupola, I should prefer the cupola to be of the kind described in my British Patent No. 22948 of 1908). The converter, when charged, is then rotated to a vertical position with the molten metal in that end which is fitted with the twyers $f$, the air blast being admitted as soon as the vertical position has been reached. Preferably, the admission and stopping of the air blast is accomplished automatically by a device such as that described with reference to Fig. 4, so that the starting and stopping of the air blast is more or less gradual. The molten metal remains under the action of the twyers $f$ until the bulk of the impurities are eliminated. When the required degree of purity has been attained, the converter is rotated into an inverted position, as shown in Fig. 1, the air being cut off from the twyers. The end of the converter which now contains the charge has been preheated by the hot gases given off during the previous operation, and to regulate this an additional closable outlet may be provided for the escape of the hot gases. The electrodes $i$ are now brought into position and the current switched on, any suitable number of electrodes being employed and the current being either direct or single-phase or multi-phase alternating. On the completion of the electrical refining, the current is switched off, and the contents of the converter are removed either by tapping the metal at $l$, leaving the slag behind, or by first removing the slag through the opening $k$ and then rotating the converter to a horizontal position so as to pour out the metal through the opening $k$. The cycle of operations may then be repeated.

It is not necessary that the electrodes should be introduced through the side wall of the converter, as they may be introduced through the bottom.

I claim:—

1. Metallurgical apparatus of the character described comprising a double-ended converter of approximately cylindrical shape adapted to be rotated end over end and having twyers at one end and refining means at the other end, as set forth.

2. Metallurgical apparatus comprising a double-ended converter mounted to rotate about an axis which is at right angles to that of the converter and having twyers at one end and refining means at the opposite end, as set forth.

3. Apparatus for the production of steel comprising a double-ended converter formed with a charging opening midway between the ends, and trunnions fixed on opposite sides of said converter by which the same is supported and upon which the said converter may be rotated, as set forth.

4. Apparatus for the production of steel comprising a double-ended converter mounted to be rotated end over end, twyers fitted at one end of said converter, and refining means fitted at the other end, the twyers and refining means being brought into operative position by rotation of the converter, as set forth.

5. Apparatus for the production of steel comprising a double-ended converter mounted to rotate end over end, twyers fitted at one end of said converter, and electrodes fitted at the other end, as set forth.

6. Apparatus for the production of steel comprising a double-ended converter mounted to rotate end over end, twyers fitted at one end of said converter, refining means at the other end, and a valve for opening and closing the air supply to the twyers, as set forth.

In testimony whereof I have hereunto set my hand in presence of two subscribing witnesses.

HENRY JOHNSON.

Witnesses:
LUTHER J. PARR,
CHAS. N. DANIELS.

Copies of this patent may be obtained for five cents each, by addressing the "Commissioner of Patents, Washington, D. C."